United States Patent [19]

Belfort

[11] 4,289,694
[45] Sep. 15, 1981

[54] PROCESS FOR THE INDUSTRIAL PREPARATION OF WATER INSOLUBLE AZO DYESTUFFS CONTAINING CYANO GROUPS FROM THE CORRESPONDING HALOGEN COMPOUNDS

[75] Inventor: Gerard L. A. Belfort, Oissel, France

[73] Assignee: Produits Chimiques Ugine Kuhlmann, Courbevoie, France

[21] Appl. No.: 41,658

[22] Filed: May 23, 1979

[30] Foreign Application Priority Data

May 31, 1978 [FR] France .................................. 78 16184

[51] Int. Cl.³ .............................................. C09B 43/00
[52] U.S. Cl. ................................... 260/208; 260/144; 260/152; 260/155; 260/165; 260/196; 260/205; 260/206; 260/207; 260/207.1; 260/207.5; 260/438.1; 252/429 R
[58] Field of Search ..................... 260/208, 144 P, 205, 260/206, 207, 207.1, 207.5, 465 D, 465 E, 465 F, 465 G, 465 H, 465 J, 438.1, 152, 154, 155, 165

[56] References Cited

U.S. PATENT DOCUMENTS

| | | | |
|---|---|---|---|
| 3,772,268 | 11/1973 | Giles et al. ........................... | 260/208 |
| 3,876,621 | 4/1975 | Hagen et al. ......................... | 260/157 |
| 3,962,209 | 6/1976 | Gottschlich et al. ................ | 260/152 |
| 3,968,091 | 7/1976 | Leverenz .............................. | 260/208 |
| 3,978,040 | 8/1976 | Gottschlich et al. ................ | 260/205 |
| 4,045,430 | 8/1977 | Hamprecht .......................... | 260/208 |
| 4,083,844 | 4/1978 | Gottschlich et al. ................ | 260/174 |
| 4,083,846 | 4/1978 | Leverenz .......................... | 260/207.1 |
| 4,105,655 | 8/1978 | Gottschlich et al. ............ | 260/207.1 |
| 4,126,610 | 11/1978 | Belfort ................................ | 260/205 |

*Primary Examiner*—Floyd D. Higel

*Attorney, Agent, or Firm*—Beveridge, DeGrandi, Kline & Lunsford

[57] ABSTRACT

A process for the manufacture of a cyano azo dyestuff insoluble in water, of the formula (I)

$$(CN)_n{-}A{-}N{=}N{-}B \qquad (I)$$

from a halogenated azo compound of the formula (II)

$$(Hal)_n{-}A{-}N{=}N{-}B \qquad (II)$$

in which A denotes a benzene radical carrying one or more nitrile or halogen substituents in the ortho position with respect to the azo group, Hal represents a halogen atom, in particular bromine, chlorine or iodine, B denotes the radical of a coupling component, preferably a substituted para-amino arylene radical, A and B are free from water-solubilizing groups and may carry other substituents usual in azo dyestuffs, n is 1 or 2, characterized in that a compound of formula (II) is reacted with an alkali metal cyanide, preferably sodium cyanide, and the operation is effected in the absence of water and in a solvent formed by a thioether of the formula (III)

$$X{-}R{-}S{-}R'{-}H \qquad (III)$$

where R and R' are the same or different and denote an alkylene radical having from 1 to 8 carbon atoms, a straight or branched chain able to contain an —O— or —S— bridge and in the presence of a catalyst constituted by a combination between the thioether of formula (III) and a cuprous salt.

21 Claims, No Drawings

PROCESS FOR THE INDUSTRIAL PREPARATION OF WATER INSOLUBLE AZO DYESTUFFS CONTAINING CYANO GROUPS FROM THE CORRESPONDING HALOGEN COMPOUNDS

The present invention relates to a process for the preparation of cyano azo dyestuffs from the corresponding halogen compounds.

The preparation of organic cyano compounds by treatment of the corresponding halogen compounds with a metal cyanide, preferably cuprous cyanide used as such or in the form of mineral or organic complexes thereof, is well known from the prior art literature. The application of these cyanizing methods to water-insoluble halogenated azo dyestuffs of which the halogen atoms are in the ortho position with respect to the azo group, has also been described in numerous patents, for example, French Pat. Nos. 1,511,932, 2,196,325, 2,253,430 and 2,343,783.

However, these processes at the industrial level have a certain number of disadvantages. In particular, after each reaction, the recovery of the solvents used which are mixed with the water or other solvent is difficult and costly. Furthermore, the frequently recommended use of the cuprous cyanide with strongly polar solvents leads to the formation of undesirable secondary products which reduce the yield and the quality of the dyestuffs. Another important disadvantage is that in these processes, the copper necessary to the reaction as a catalyst is again found in the dyestuffs as a water-insoluble cuprous halide and it has to be eliminated either directly from the reaction medium or from the isolated dyestuff pastes. This removal of the copper by a further complete treatment of the dyestuff in a medium in which the cuprous salts are oxidized or form a complex, or by washing the crude cake of dyestuff with an organic solvent, constitutes industrially a long, delicate and costly purification process. In any case, the copper is lost indicating that, for each industrial operation, a fresh consumption of copper is required.

U.S. Pat. No. 3,772,268 describes a cyanization process leading to dyestuffs containing scarcely any copper owing to the use as solvent of a mixture containing a di(hydroxyalkyl)-sulfide in the presence of a cyanide and a catalyst formed by complexing a copper salt and di(hydroxyalkyl)-sulfide. The recovery of the dye is made by dilution of the reaction medium with water and filtration, which permits a direct and easy elimination of the cuprous complex and of the solvent since these are soluble in the water. However, this process has disadvantages at the industrial level. In fact, the recovery of the solvent solubilized in the water is difficult and costly; the absence of recovery causes industrial pollution and makes the expenses of manufacture heavy. Further, the cuprous complex serving as catalyst cannot be recovered and the copper is found in the effluents from the treatment, which gives a pollution problem.

French patent application No. 2,347,415 which corresponds to U.S. Pat. No. 4,126,610, described an improved process owing to the use as solvent of bis(-cyanoalkyl)-sulfide in the presence of water, an alkali metal cyanide and a cuprous salt forming a complex with the solvent. These solvents permit a direct isolation of the cyano dyestuffs obtained without it being necessary to cause crystallization by dilution with water or other solvent. In addition, the cuprous complexes, soluble in the sulfide are stable and highly reactive for catalyzing the cyanization reaction and are found without change or loss in the reaction solvent after isolation of the manufactured dyestuff. From these properties it results that the solvent and the cuprous complex are recovered and can be used again. Nevertheless, the use of these bis(cyanoalkyl)-sulfides shows at the industrial level some drawbacks which are related to the presence of the nitrile groups in these molecules and to the physico-chemical properties which follow therefrom. In fact, these sulfides are not in general liquid at temperatures above the ambient temperature, so that their use as solvent necessitates maintaining the temperature above the crystallization temperature during the entire time of manipulation and storage. On the other hand, these solvents are not strictly inert towards the reaction medium; a slight hydrolysis of the nitrile groups, activated in the presence of the copper derivatives, is produced and the recovery of the solvents then becomes more difficult.

The present inventor has found a new industrial process which is more economical and non-polluting and permits an easy recovery of the solvent and of the copper catalyst used and the obtaining of cyano dyestuffs of high purity.

The invention relates to a process for the manufacture of a cyano azo dyestuff insoluble in water, of the formula (I):

$$(Cn)_n—A—N=N—B \quad (I)$$

from a halogenated azo compound of the formula (II):

$$(Hal)_n—A—N=N—B \quad (II)$$

in which A represents a benzene radical containing one or more nitrile or halogen substituents in the ortho position with respect to the azo group, Hal represents a halogen atom, especially bromine, chlorine or iodine, B represents the radical of a coupling component, preferably a substituted para-amino arylene radical, A and B are free from water-solubilizing groups and, as more fully described hereinafter, may carry other substituents usual in azo dyestuffs, and n is 1 or 2, characterized in that a compound of formula (II) is reacted with an alkali metal cyanide, preferably sodium cyanide, and the operation is effected in a solvent formed by a thioether of formula (III):

$$X—R—S—R'—H \quad (III)$$

in which R and R' are the same or different and represent an alkylene radical, having from 1 to 8 carbon atoms, consisting in a straight or branched chain able to contain an —O— or —S— bridge, and X represents a hydrogen atom or a hydroxyl group, and in the presence of a catalyst formed by a combination between a thioether of formula (III) and a cuprous salt.

As examples of the radicals of coupling components B may be mentioned those of aniline and its N-alkyl derivatives p.e. N-methyl aniline, N-ethyl-aniline, N,N-dimethyl-aniline, N,N-diethylaniline, N-($\beta$-hydroxyethyl)-aniline, N-methyl-N-($\beta$-hydroxyethyl)-aniline, N-ethyl-N-($\beta$-hydroxyethyl)-aniline, N-butyl-N-($\beta$-hydroxyethyl)-aniline, N,N-bis-($\beta$-hydroxyethyl)-aniline, N-($\beta$-cyanethyl)-aniline, N-methyl-N-($\beta$-cyanethyl)-aniline, N,N-bis-($\beta$-cyanethyl)-aniline, N-($\beta$-hydroxyethyl)-N-($\beta$-cyanethyl)-aniline, N-($\beta$-carbomethoxyethyl)-aniline, N-ethyl-N-(β-carboethoxyethyl)-aniline, N-(β-cyanethyl)-N-(β-carbomethoxyethyl)-aniline, N,N-bis(β-carbomethoxyethyl)-aniline, N-ethyl-N-(β-acetoxyethyl)-aniline, N-(β-cyanethyl)-N-(β-acetoxyethyl)-aniline, N,N-bis-(β-acetoxyethyl)-aniline, N-ethyl-N-(β-methoxyethyl)-aniline, N,N-bis(2,3-dihydroxypropyl)-aniline, N-ethyl-N-(2-hydroxy-3-chloropropyl)-aniline, N-benzyl-N-(β-cyanethyl)-aniline, and also 3-methyl-aniline, 2,5-dimethyl-aniline, 2-methoxy-aniline, 3-ethoxy-aniline, 5-methyl-2-methoxy-aniline, 5-methyl-2-ethoxy-aniline, 2,5-dimethoxy-aniline, 3-acetylamino-aniline, 2-methoxy-5-acetylamino-aniline, 2-ethoxy-5-acetylamino-aniline and the corresponding N-substituted derivatives of these amines. Diphenylamine, 1-amino-naphtalene and its N-substituted derivatives p.e. 1-(N,N-dimethylamino)-naphtalene or 1-(N-β-hydroxyethylamino)-naphtalene, 1,2,3,4-tetrahydroquinoline and its N-substituted derivatives p.e. N-(β-hydroxyethyl)-1,2,3,4-tetrahydro-quinoleine and N-(β-cyanethyl)-1,2,3,4-tetrahydro-quinoleine. Moreover 1-hydroxy-benzene, 1-hydroxy-2-methyl-benzene, 1-hydroxy-methyl-benzene, 1-hydroxy-3-acetylamino-benzene, 1-hydroxy-3-methoxy-benzene, 1-hydroxy-2,5-dimethyl-benzene, 1-hydroxy-naphtalene, 8-hydroxy-quinoline, 2-methyl-indole, 2-phenyl-indole.

As examples of thioethers of formula (III) may be mentioned diethyl sulfide, dipropyl sulfide, ethyl propyl sulfide, din-amyl sulfide, ethyl isoamyl sulfide, propyl isoamyl sulfide, diisoamyl sulfide, dihexyl sulfide, ethyl β-hydroxyethyl sulfide, butyl β-hydroxyethyl sulfide, methyl β-hydroxyethyl sulfide, di-β-hydroxy β'-methoxy diethyl sulfide, di-β-hydroxy β'-ethoxy diethyl sulfide, di-β-ethoxyethyl sulfide, butyl β-hydroxyethyl sulfide, butyl β-ethoxyethyl sulfide, sec.-butyl β-hydroxyethyl sulfide, terbutyl β-hydroxyethyl sulfide, di-thioethyleneglycol dimethylether; ethyl β-hydroxyethyl sulfide, which is a current product manufactured in the chemical industry, will be particularly preferred. These compounds, although already known in the literature, have never to the knowledge of the applicant been described for the preparation of cyano azo compounds.

These thioethers of formula (III) constitute reaction media of greatest value, since they are at the reaction temperature excellent solvents for halogenated compounds of formula (II) and corresponding cyano compounds of formula (I), so that the cyanization reaction may be taken to completion without risk of blocking owing to a partial rendering insoluble of the substances engaged. They have the property of causing a rapid start of reaction of the reagents, without so much as producing secondary reactions, so that the products obtained are very pure. They also permit the dyestuffs of formula (I) to be isolated at the ambient temperature directly by filtration, without it being necessary to add water or other solvent. Furthermore, these solvents are perfectly stable in the medium in spite of the presence of copper derivatives; thus, their direct recycling is effected easily and practically without limits.

On the other hand, the applicant has established that the cuprous complexes act as very active catalysts of the cyanization reaction. By way of example, the molecular combination of formula (IV) may be mentioned:

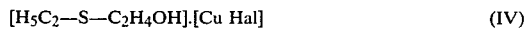

[H₅C₂—S—C₂H₄OH].[Cu Hal]     (IV)

The applicant has also found that the cuprous complexes are themselves soluble in the thioethers of formula (III) and that solutions obtained are perfectly stable, even after several months of use, so that it is possible, when a reaction is finished and after cooling, then filtration of the dyestuff, to recover them practically completely, at the same time as the solvent which contains them. The quality of solvent obtained is such that it can be directly recycled a large number of times. In other words, from a practical point of view the cyanization reaction only consumes the alkali metal cyanide and the consummation of cuprous derivative and solvent becomes very small, even negligible.

In practice, the new process consists first of all essentially in the first operation in preparing the organic copper complex. This is effected by addition of a cuprous salt in an excess of thioether of the formula (III); it may be advantageous, but not indispensable, to heat slightly to 40°–60° C. in order to reduce the time of formation of the complex. One may also, optionally, introduce the previously isolated catalyst directly into the reaction solvent. Then the halogenated azo compound is added and then the alkali metal cyanide and the temperature is taken to the reaction temperature. The completion of the reaction is controlled by chromatography on a thin layer, then the reaction is cooled. The cyano dyestuff, which has precipitated, and the alkali metal halide formed during the substitution are separated by filtration; the filtrate contains nearly the whole of the solvent and the complex used in the reaction. The dyestuff is then washed with water, sodium chloride being added to the wash water if desired, and the last parts of solvent can be recovered by decantation, since it is insoluble or very slightly soluble in this medium. The solvent fractions thus recovered contain, in addition to a small amount of dissolved cyano-dyestuff, all the catalyst put in at the beginning; its purity is such that it may be directly recycled for further operations, without any particular treatment or fresh addition of catalyst.

The dyestuff produced is generally of great purity; its content of residual copper salts (expressed as elementary copper) does not exceed 0.1%.

The reaction temperature may also be varied over a wide range; this temperature must be adapted to each case, chiefly according to the structure and also the nature of the halogen of the compound of formula (II). It is general to work at temperatures between 60° and 150° C. and preferably between 80° and 100° C.

As alkali metal cyanides are to be understood the salts of lithium, ammonium, and above all those of potassium and sodium. To obtain a complete reaction, it is generally sufficient to use the stoichiometric amount of cyanide; this proportion, however, may be slightly increased in some cases without affecting the process, up to twice the stoichiometric amount.

In the molecular combinations of copper and thioether, the cuprous salts to be used may, without affecting the result of the reaction, be a halide or also a derivative of a carboxylic acid as, for example, the acetate. For practical reasons, however, it is preferred to use cuprous bromide or cuprous chloride. The said molecular combinations may in general be isolated in the form of crystalline products which are stable and with a definite melting point, for example, from their concentrated solutions of thioethers. As has been previously described, it is not, however, indispensable to isolate them. The quantity of catalyst necessary so that the cyanization reaction takes place may be very small; in practice, in order to obtain a suitable speed of cyanization and good yields of cyano dyestuff, it has been found that the proportion of catalyst would usually have to be between 0.1 and 0.8 and preferably between 0.25 and 0.5 atoms of copper per mole of halogenated dyestuff used.

The halogenated azo compounds of formula (II) can be prepared in a known manner, for example, by diazotization of an orthohaloaniline, then coupling the diazo compound obtained with a coupling compound. The radicals A and B of the formula (I) may contain substituents usual for the class of disperse azo dyestuffs, for example, halo, nitro, cyano, trifluoroalkyl, or sulfonyl for A and acylamino, acyl, secondary or tertiary amine, alkyl, alkoxy, aryl, aralkyl or ester of carboxylic acid for B.

The dyestuffs of formula (I) are chiefly used in dispersed form for the coloration of cellulose esters and polyesters.

According to a preferred form of the new process, the cyano azo dyestuff of formula (I) corresponds to the formula:

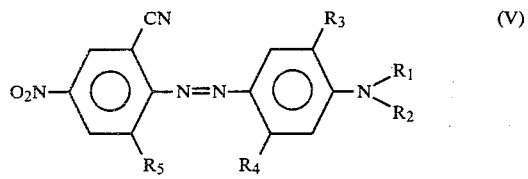

and the halo azo compound of formula (II) corresponds to one of the formulae:

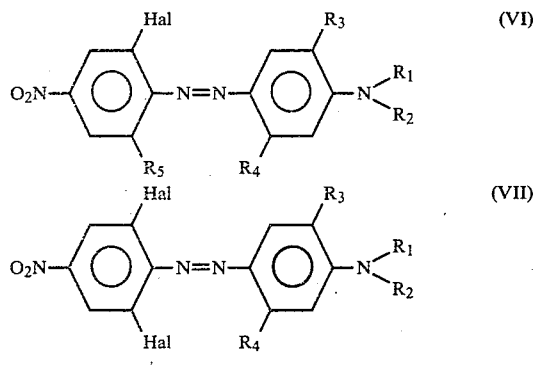

in which:

$R_1$ represents H, an unsubstituted alkyl group containing from 1 to 4 carbon atoms or said alkyl group substituted by OH, Cl, F, CN, $COOR_6$, $OCOR_6$, $OCO_2R_6$, $OR_6$, $OCOCH=CH$-phenyl, or a phenylalkyl group wherein the alkyl contains from 1 to 2 carbon atoms;

$R_2$ has the same significance as $R_1$ or represents a phenyl or cyclohexyl group;

$R_3$ represents a hydrogen atom or an alkyl (1 to 2 carbon atoms), alkoxy (1 to 2 carbon atoms), aryloxy or aralkoxy group;

$R_4$ represents H, $CH_3$, $OCH_3$, $OC_2H_5$, Cl, $NHSO_2R_6$, $NHCOOR_6$ or $NHCOR_6$;

$R_5$ represents H, $CF_3$, $COR_6$, CN, $NO_2$ or $SO_2R_6$; and $R_6$ is an alkyl (1 to 2 carbon atoms) cyclohexyl, phenyl, tolyl or methoxyphenyl radical.

The following examples, in which the parts are parts by weight unless the contrary is specified, illustrate the invention without restricting it thereto.

EXAMPLE 1

357 Parts of ethyl β-hydroxy sulfide, 2.23 parts of cuprous chloride, 21.55 parts of 3-acetamido-4-(2'-bromo 4',6'-dinitrophenylazo)N,N-diethylaniline and finally 2.20 parts of sodium cyanide are successively introduced into a reactor. Then the temperature is taken in a period of about 45 minutes to 90° C.; during the heating, the evolution of the reaction is controlled by chromatography in a thin layer and it is found that the substitution of the bromine by the cyanide begins as the temperature reaches 40° C., and that its speed accelerates considerably as the temperature reaches 60° C. so that on reaching 90° C., the rate of conversion is 99% with respect to the bromo derivative present at the beginning. The reaction mass is cooled to 20° C., the effect of which is to bring about the crystallization of the cyano dyestuff. It is filtered off, then washed with 350 parts of water in order to displace the solvent contained in the paste and finally it is dried. 18 Parts of 3-acetamido-4-N,N(2'-cyano-4',6'-dinitrophenylazo)-diethylamine are thus obtained. This product titrates at 99.6%, the content of the halogenated compound started with is only 0.4% and the content of copper is less than 600 parts per million. The wash water is introduced into a decanter or separator; 120 parts of sodium chloride are added in order that the organic part of the solvent is completely separated, and it is drawn off and united with the fraction of solvent obtained during the filtration. 355 Parts of ethyl β-hydroxyethylsulfide are thus recovered, which contains, besides almost all the copper used, about one part of the dissolved cyano azo dyestuff (which carries the total balance sheet of the reaction to more than 99%).

EXAMPLE 2

The operation is as in Example 1, but starting from the ethyl β-hydroxyethyl sulfide which has just been recovered and of course without adding cuprous chloride. 19 Parts of 3-acetamido-4-N,N(2'-cyano-4',6'-dinitrophenylazo)-diethylaniline, substantially pure, are obtained, of which the content of copper is less than 1,000 parts per million. The recovery of the ethyl β-hydroxyethyl sulfide and of the copper complex which it contains, under the same conditions as previously described, allows a new reaction. One will thus be able to carry out, for example, more than ten successive operations without appreciable differences being noted in the quality of the solvent and in the reactivity of the catalyst which it contains. The cyano dyestuff is always produced with a yield of over 95%.

EXAMPLE 3

20 Parts of cuprous chloride are stirred into 150 parts of ethyl β-hydroxyethyl sulfide and by light heating to 50° C., a total solution is obtained. After elimination of a few solid particles, the solution is cooled to −15° C. A compound slowly separates, which is filtered, washed with a small amount of carbon tetrachloride and then dried at 60° C. 7.5 Parts of catalyst are isolated and are present in the form of a greenish powder, the melting point of which is 151.3°–153.1° C.

The elementary analysis gave the following composition:

[$H_5C_2$—S—$C_2H_4OH$].[CuCl]

Calculated (%): C=23.41; H=4.87; S=15.6; Cu=30.9; Cl=17.3. Found (%): C=23.59; H=4.43; S=15.78; Cu=30.8; Cl=17.19.

The principal characteristic absorption bands in the infra-red (KBr) are: 2930 (m), 2890 (m), 2850 (F), 1470 (m), 1458 (m), 1401 (m), 1252 (m), 1075 (F), 1058 (F).

5.77 Parts of previously prepared catalyst in the solid state are dissolved in 357 parts of ethyl β-hydroxyethyl sulfide. Then 21.55 parts of 3-acetamido-4-N,N(2'-bromo-4',6' dinitrophenyl azo)-diethylaniline are added and then 2.20 parts of sodium cyanide. The cyanization is then effected in a manner analogous to that in Example 1. The dyestuff thus prepared is obtained with a yield over 95% and its content of copper is less than 1,000 parts per million.

EXAMPLE 4

5.2 Parts of cuprous bromide are added to 300 parts of ethyl β-hydroxyethyl sulfide, and the complex is obtained by agitation. Then 20 parts of 3-acetamido-4-N,N)2',6'-dibromo-4'-nitrophenylazo)-diethylaniline are introduced and then 4.2 parts of sodium cyanide. The temperature is taken to 110°–115° C. and maintained at this for one hour. The total absence of the dibromo derivative initially used can then be controlled by chromatography. After cooling to 20° C. the product formed is separated as in Example 1. 12.3 Parts of 3-acetamido-4-N,N(2',6'-dicyano-4'-nitrophenylazo)-diethylaniline are collected of which the content of monocyano derivative is equal to or inferior to 5%. The recovery of the ethyl β-hydroxyethyl sulfide is 300 parts comprising, besides the copper complex, about 3.5 parts of the dissolved dicyano azo dyestuff (which carries the total balance-sheet of the reaction of dicyanization to more than 95%).

EXAMPLE 5

Example 1 is repeated except that the ethyl β-hydroxyethyl sulfide is replaced by the same quantity of di-n-propyl sulfide. 13.4 Parts of the cyano azo dyestuff are obtained of which the content of copper is less than 1,000 parts per million. The di-n-propyl sulfide recovered as well as the copper which it contains may be recycled for a further cyanization reaction.

EXAMPLE 6

300 Parts of methyl hydroxypropyl sulfide, 2 parts of sodium cyanide and 2.39 parts of cuprous chloride are stirred for three hours. Then 15.5 parts of 3-acetamido-4-N,N(2'-bromo-4',6'-dinitrophenylazo)-dihydroxyethylaniline are added and then the mixture is heated at 95° C. for one hour. The reaction mass is cooled to 20° C. The cyano dyestuff is filtered off, then washed with water and finally dried. 13 Parts of 3-acetamido-4-N,N(2'-cyano-4',6'-dinitrophenylazo)-dihydroxyethylaniline are thus obtained. This product titrates 98% and its content of copper is less than 1,000 parts per million. The solvent and the copper complex are recovered and recycled.

What is claimed is:
1. A process for the manufacture of a cyano azo dye which is insoluble in water and has the formula:

$$(CN)_n-A-N=N-B \quad (I)$$

starting from a halogen azo compound of the formula:

$$(Hal)_n-A-N=N-B \quad (II)$$

in which A denotes a benzene radical containing one or more nitrile or halogen substituents in the ortho position with respect to the azo group, Hal represents a halogen atom, B denotes the radical of a coupling component, A and B are free from water-solubilizing groups and n is 1 or 2, wherein a compound of formula (II) is reacted with an alkali metal cyanide in the absence of water and in the presence of a sulfide solvent of the formula:

$$X-R-S-R'-H \quad (III)$$

where R and R' may be the same or different and denote an alkylene radical having from 1 to 8 carbon atoms with a straight or branched chain able to contain an —O— or —S— bridge and X represents a hydrogen atom or a hydroxyl group, in the presence of a catalyst constituted by a combination between the sulfide solvent of formula (III) and a cuprous salt.

2. The process according to claim 1, in which the temperature of the operation is between 60° and 150° C.

3. The process according to claim 2 in which ethyl β-hydroxyethyl sulfide is used as solvent and as constituent of the catalyst.

4. The process according to claim 1 in which ethyl β-hydroxyethyl sulfide is used as solvent and as constituent of the catalyst.

5. The process according to claim 4 in which the catalyst is used at the rate of 0.1 to 0.8 atoms of copper contained in the catalyst per mole of halogenated compound (II).

6. The process according to claim 3 in which the catalyst is used at the rate of 0.1 to 0.8 atoms of copper contained in the catalyst per mole of halogenated compound (II).

7. The process according to claim 2 in which the catalyst is used at the rate of 0.1 to 0.8 atoms of copper contained in the catalyst per mole of halogenated compound (II).

8. The process according to claim 1 in which the catalyst is used at the rate of 0.1 to 0.8 atoms of copper contained in the catalyst per mole of halogenated compound (II).

9. The process according to claim 8 in which the catalyst necessary to effect the manufacturing operation is contained in the solvent used, recycled from the previous operation after separation of the dyestuff (I).

10. The process according to claim 7 in which the catalyst necessary to effect the manufacturing operation is contained in the solvent used, recycled from the previous operation after separation of the dyestuff (I).

11. The process according to claim 6 in which the catalyst necessary to effect the manufacturing operation is contained in the solvent used, recycled from the previous operation after separation of the dyestuff (I).

12. The process according to claim 5 in which the catalyst necessary to effect the manufacturing operation is contained in the solvent used, recycled from the previous operation after separation of the dyestuff (I).

13. The process according to claim 4 in which the catalyst necessary to effect the manufacturing operation is contained in the solvent used, recycled from the previous operation after separation of the dyestuff (I).

14. The process according to claim 3 in which the catalyst necessary to effect the manufacturing operation is contained in the solvent used, recycled from the previous operation after separation of the dyestuff (I).

15. The process according to claim 2 in which the catalyst necessary to effect the manufacturing operation is contained in the solvent used, recycled from the previous operation after separation of the dyestuff (I).

16. The process according to claim 1 in which the catalyst necessary to effect the manufacturing operation is contained in the solvent used, recycled from the previous operation after separation of the dyestuff (I).

17. The process according to claim 1 wherein the halogen is bromine, chlorine or iodine.

18. The process according to claim 1 wherein the coupling component B is a substituted para-amino arylene radical.

19. The process according to claim 1 wherein the alkali metal cyanide is sodium cyanide.

20. The process according to claim 1 wherein the temperature of the operation is between 80° and 100° C.

21. A process according to claim 1, 2, 3, 4, 5, 6, 7, 8, 9, 10, 11, 12, 13, 14, 15, 16, 17, 18, 19 or 20 in which the cyano azo dyestuff of formula (I) corresponds to the formula (V):

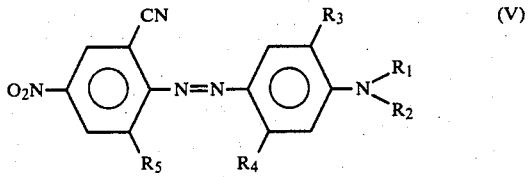

and the halogenated azo compound of formula (II) corresponds to one of the formulae (VI) or (VII):

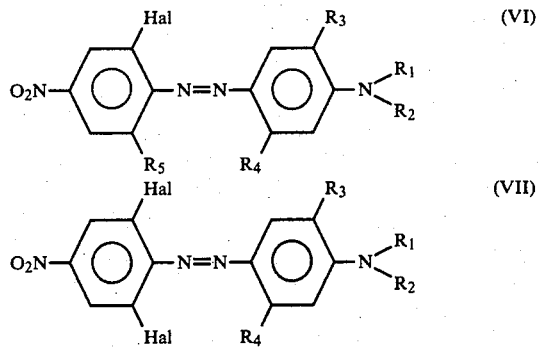

where $R_1$ denotes H, an unsubstituted alkyl group or said alkyl group substituted by OH, Cl, F, CN, $COOR_6$, $OCOR_6$, $OCO_2R_6$, $OR_6$, $OCO_2R_6$, $OCOCH=CH$-phenyl or a phenylalkyl group; $R_2$ has the same significance as $R_1$ or represents a phenyl or cyclohexyl group; $R_3$ denotes H, $CH_3$, $OCH_3$ $OC_3OC_2H_5$, or COO-alkyl; $R_4$ denotes H, $CH_3$, $OCH_3$ $OC_2H_5$, Cl, $NHSO_2R_6$, $NHCOOR_6$ or $NHCOR_6$; $R_5$ denotes H, $CF_3$, $COR_6$, CN, $NO_2$ or $SO_2R_6$ and $R_6$ is an alkyl, cyclohexyl, phenyl, tolyl, or methoxy phenyl radical.

* * * * *